US010160502B2

(12) United States Patent
Mancin et al.

(10) Patent No.: US 10,160,502 B2
(45) Date of Patent: Dec. 25, 2018

(54) DEVICE FOR LOADING AND UNLOADING A SPARE WHEEL OF A VEHICLE

(71) Applicant: FCA Italy S.p.A., Turin (IT)

(72) Inventors: Paolo Mancin, Grugliasco (IT); Antonio Magliocca, Borgaro Torinese (IT)

(73) Assignee: FCA Italy S.p.A., Turin (IT)

( * ) Notice: Subject to any disclaimer, the term of this patent is extended or adjusted under 35 U.S.C. 154(b) by 531 days.

(21) Appl. No.: 15/071,793

(22) Filed: Mar. 16, 2016

(65) Prior Publication Data

US 2016/0311477 A1  Oct. 27, 2016

(30) Foreign Application Priority Data

Apr. 21, 2015 (IT) .................. 102015000012588

(51) Int. Cl.
*B62D 43/04* (2006.01)
(52) U.S. Cl.
CPC .................. *B62D 43/045* (2013.01)
(58) Field of Classification Search
CPC .......................................... B62D 43/00–43/10
See application file for complete search history.

(56) References Cited

U.S. PATENT DOCUMENTS

| 4,884,785 | A | * | 12/1989 | Denman | ............... | B62D 43/045 |
|   |   |   |   |   |   | 254/389 |
| 5,080,269 | A | * | 1/1992 | Larsson | ................. | B62D 43/10 |
|   |   |   |   |   |   | 224/42.12 |
| 5,118,341 | A |   | 6/1992 | Daver et al. |   |   |
| 6,082,803 | A | * | 7/2000 | Klueger | ................. | B62D 43/10 |
|   |   |   |   |   |   | 224/42.24 |
| 6,142,449 | A |   | 11/2000 | Aldridge et al. |   |   |
| 6,547,219 | B2 | * | 4/2003 | Dobmeier | ............ | B62D 43/045 |
|   |   |   |   |   |   | 224/42.23 |

(Continued)

FOREIGN PATENT DOCUMENTS

| IT | TO2014A000114 | 2/2014 |
| WO | 2008/132595 A2 | 11/2008 |

(Continued)

OTHER PUBLICATIONS

Italian Search Report, dated Dec. 8, 2015, from corresponding Italian Application No. UB20150638 (10201500012588) filed Apr. 21, 2015.

*Primary Examiner* — Sang K Kim
*Assistant Examiner* — Nathaniel L Adams
(74) *Attorney, Agent, or Firm* — Victor Cardona; Heslin Rothenberg Farley & Mesiti P.C.

(57) ABSTRACT

A device for loading and unloading a wheel of a vehicle includes an actuating device operable to move a cable between a lifted wheel position and a lowered wheel position. A support anchored to the wheel is elastically suspended to a supporting rod carried by the cable. A bracket secured to the vehicle has an axially fixed bush, through which the supporting rod moves following actuation of the cable. The rod has a lateral surface provided with projections. The rod and the bush have cam surfaces which come into engagement with each other during a final lifting stage to cause the bush to rotate towards a position in which, following a lowering of the cable, the projections rest on seats on the upper end surface of the bush to discharge the weight of the wheel.

5 Claims, 21 Drawing Sheets

(56) References Cited

U.S. PATENT DOCUMENTS

| | | | |
|---|---|---|---|
| 6,871,841 B2* | 3/2005 | Brestelli | B62D 43/045 224/42.23 |
| 2004/0265102 A1 | 12/2004 | Reznar | |
| 2015/0098779 A1* | 4/2015 | Otelli | B62D 43/045 414/463 |

FOREIGN PATENT DOCUMENTS

| | | |
|---|---|---|
| WO | 2008/132595 A3 | 11/2008 |
| WO | 2011/033355 A2 | 3/2011 |
| WO | 2011/033355 A3 | 3/2011 |

* cited by examiner

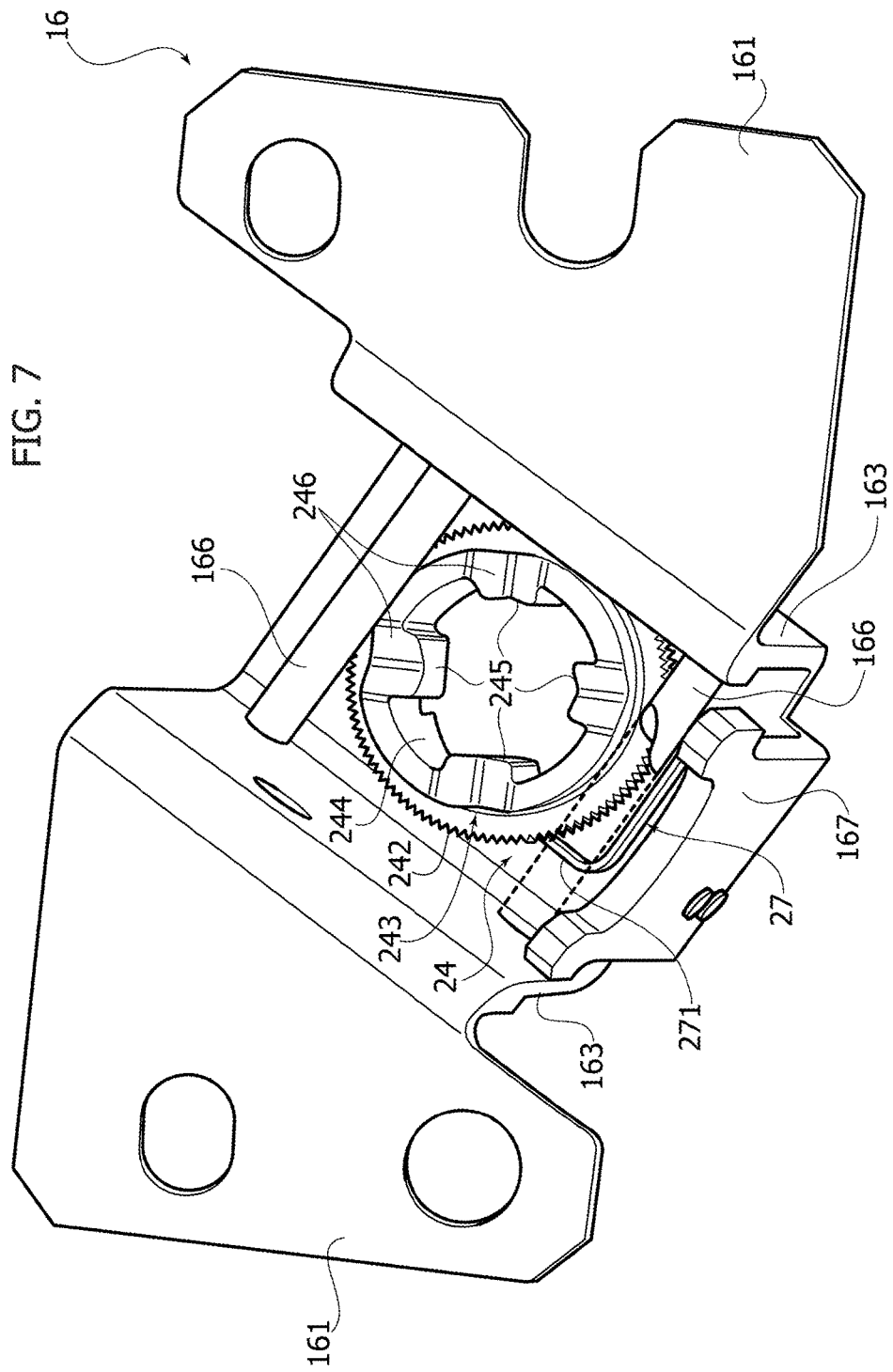

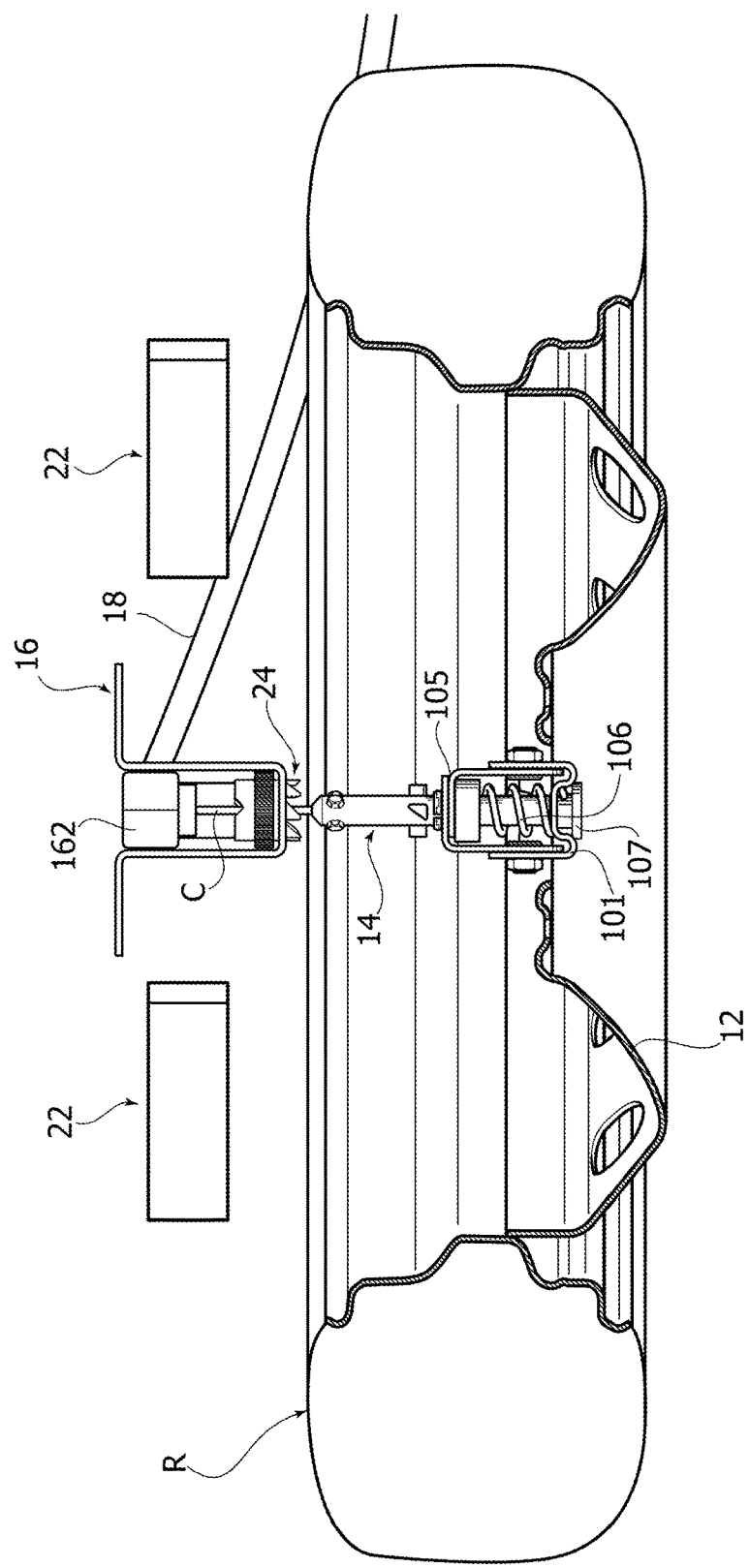

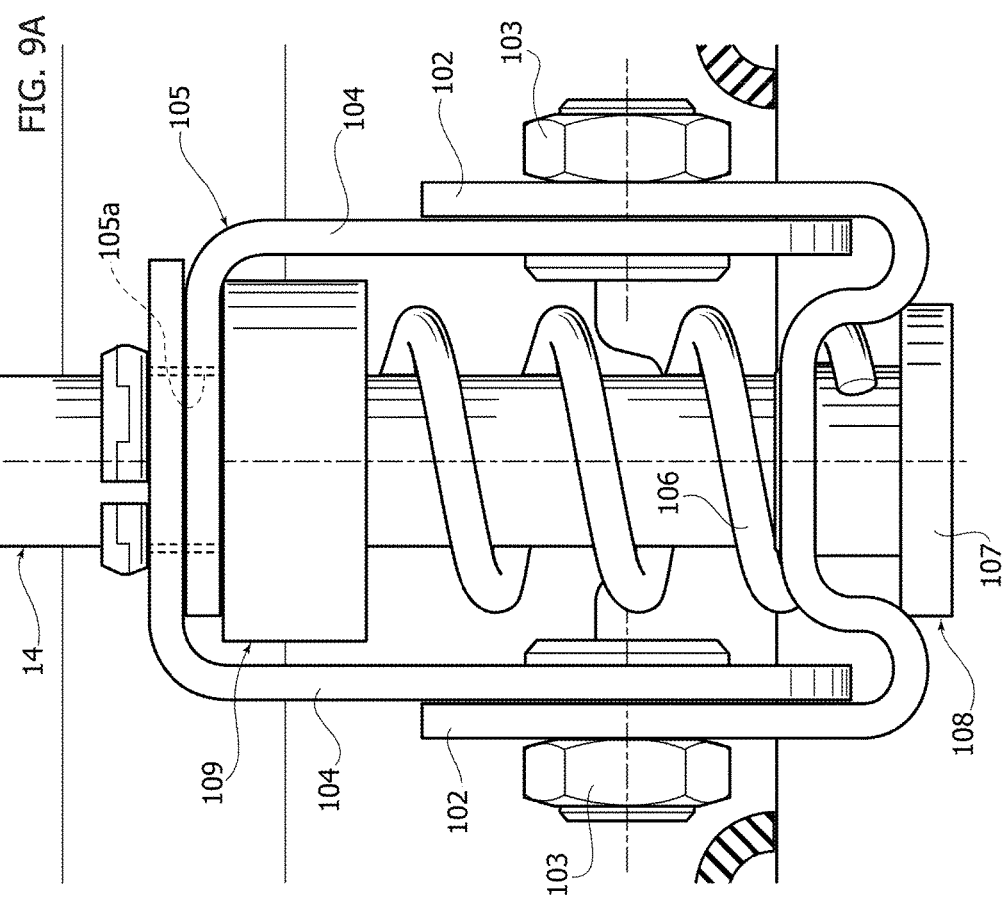

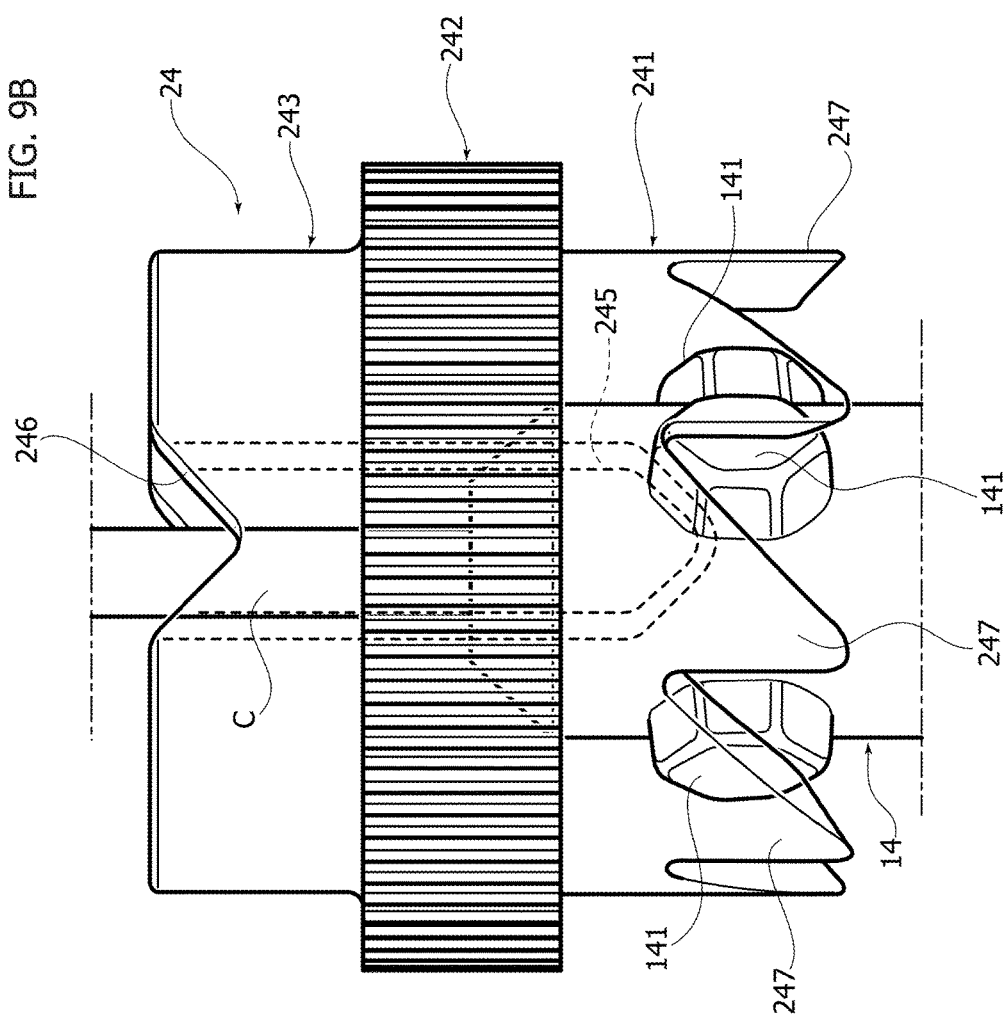

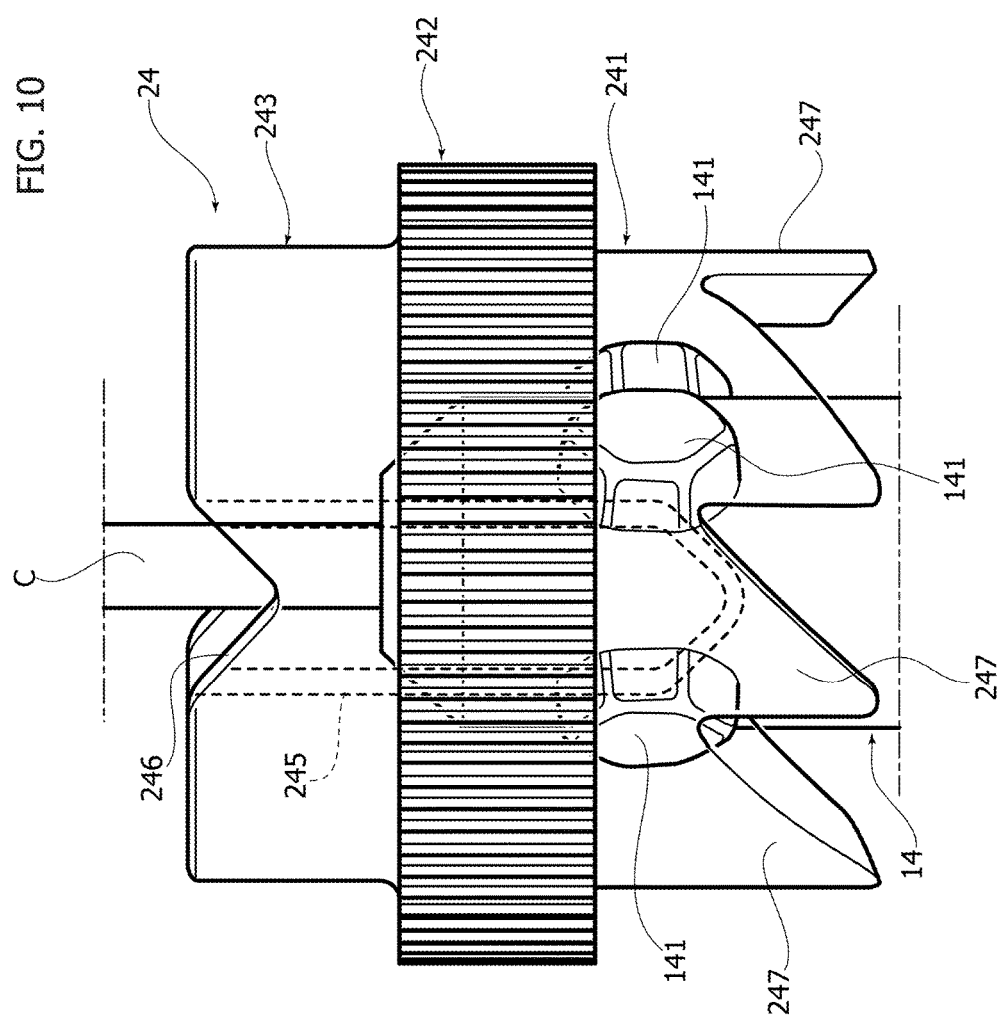

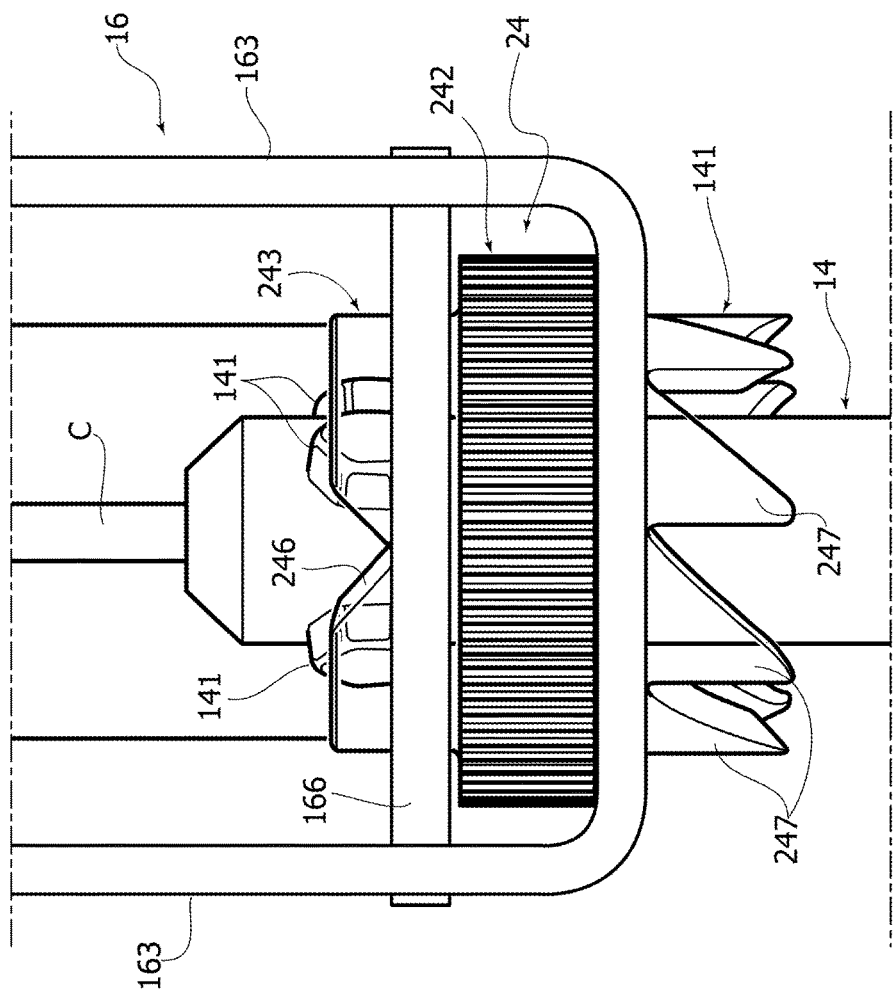

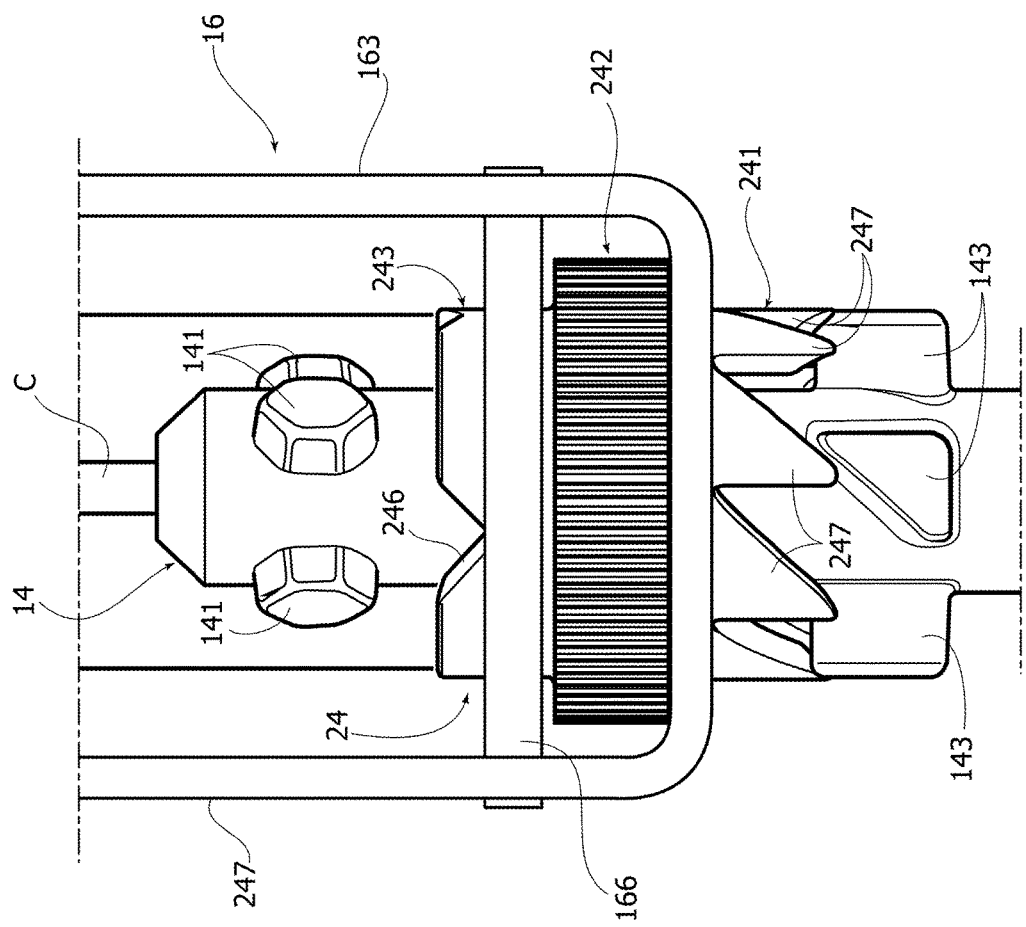

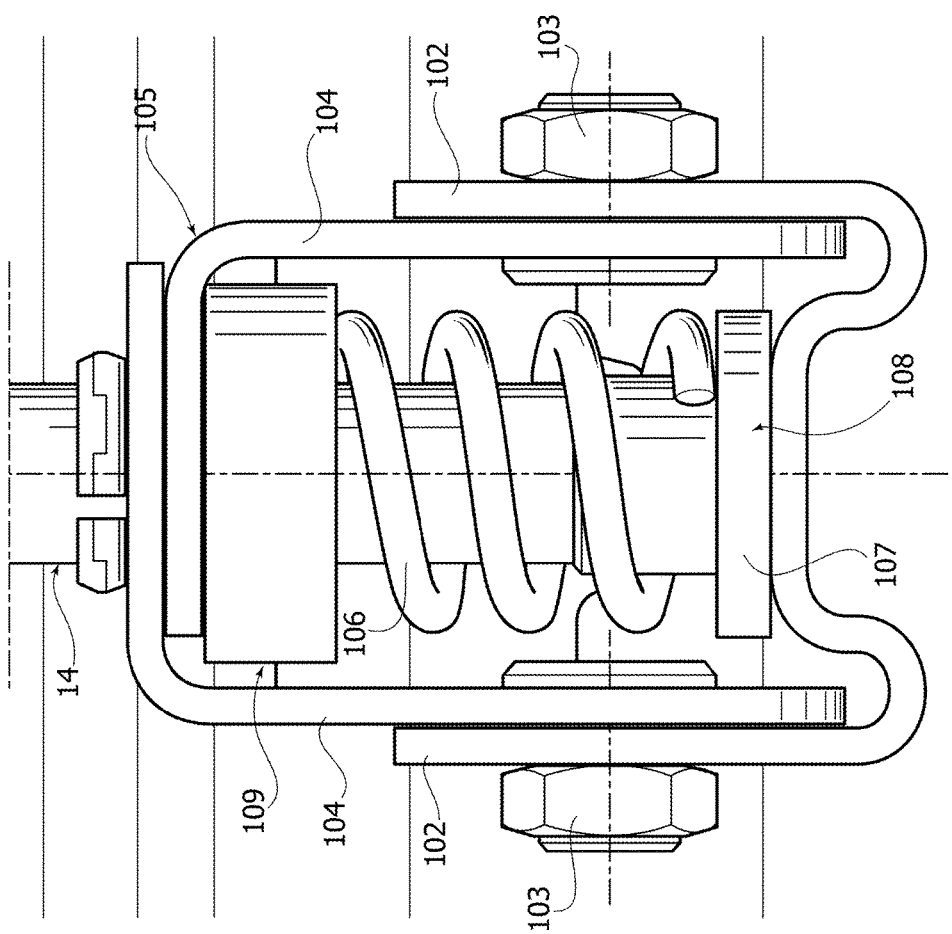

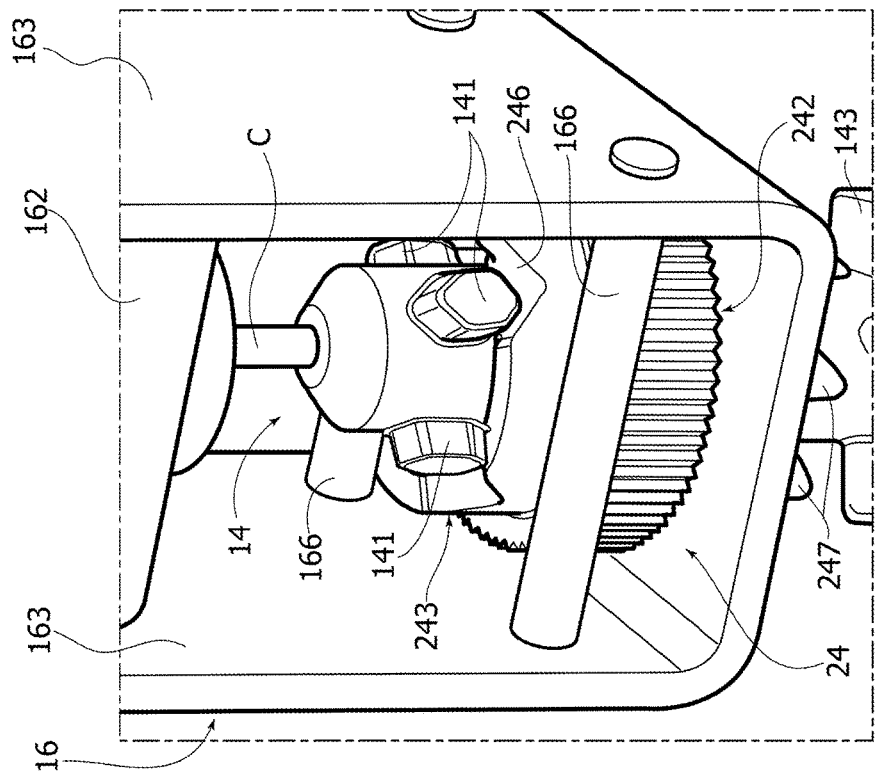
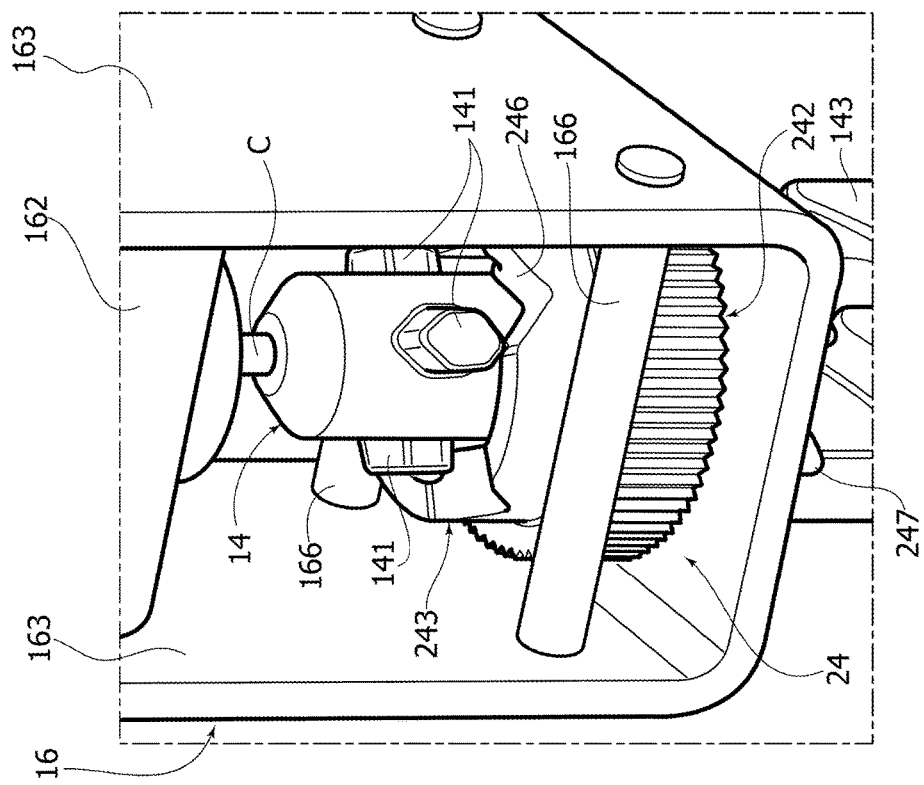

DEVICE FOR LOADING AND UNLOADING A SPARE WHEEL OF A VEHICLE

CROSS REFERENCE TO RELATED APPLICATIONS

This application claims priority of Italian application No. 102015000012588 filed on Apr. 21, 2015, the entire disclosure of which is incorporated herein by reference.

FIELD OF THE INVENTION

The present invention relates to a device for loading and unloading a spare wheel of a vehicle of the type comprising:
- a flexible cable movable between a lifted wheel position and a lowered wheel position,
- an actuating device, operable to move the flexible cable between said lifted and lowered wheel positions,
- a support anchored to the wheel, which is elastically suspended to a support member carried by the flexible cable, and
- a bracket secured to the vehicle structure, on which the weight of the wheel is discharged through said support member, when the flexible cable arrives at its lifted wheel position.

PRIOR ART

A device of the above indicated type has formed the subject of Italian patent application TO 2014 A 000114 (IT 10 2014 90223 2837), still secret at the priority date of the present application. Devices of the above indicated type have been also disclosed in documents EP 2 142 422 A2 and WO 2011/033355 A2.

OBJECT OF THE INVENTION

The object of the present invention is that of providing a device of the above indicated type which is able to safely and precisely hold the spare wheel in its lifted condition and which is efficient and convenient in use, while having a relatively simple and light structure, constituted by a reduced number of components and of a relatively reduced cost.

A further object of the invention is that of providing a device of the above indicated type which can be adapted by simple operations even on motor-vehicles on which it was not originally provided.

SUMMARY OF THE INVENTION

In view of achieving this object, the invention provides a device for loading and unloading of a spare wheel of a vehicle, having all the features which have been indicated at the beginning of the present description and further characterized in that:
- the aforesaid support member carried by the flexible cable is constituted by a rod having an upper portion connected to the flexible cable and a lower portion on which said support that is anchored to the wheel is supported by the interposition of a spring,
- said bracket secured to the vehicle structure is provided with an axially fixed bush, which is traversed by said supporting rod following an actuation of the flexible cable,
- said supporting rod has a side surface provided with projections adapted to pass through guiding passages of the inner surface of said bush during movement of the flexible cable, said projections coming out upwardly from said bush in a final part of the lifting movement of the flexible cable, and
- said supporting rod and said bush have respective cam surfaces which come into engagement with each other in the final part of the lifting movement of the flexible cable, so as to cause rotation of said bush relative to the supporting rod to a position in which, following a subsequent lowering of the flexible cable, said projections are received on seats arranged on an upper end surface of the bush, so as to discharge the weight of the wheel, through said stem and said bush, on said bracket secured to the vehicle structure.

In the preferred embodiment, the above mentioned guiding passages formed on the inner surface of said bush are defined between ribs having ends defining inclined surfaces which cooperate with inclined surfaces of the ends of said projections of the supporting rod so as to angularly orient said bush relative to said rod during movement of the flexible cable, to guide said projections into said guiding passages.

Also in the case of the above mentioned preferred embodiment, the aforesaid cam surfaces of the rod and the bush comprise a plurality of inclined surfaces defined by teeth protruding from the rod at a position spaced downwards with respect to the position of said projections, and a plurality of corresponding cam surfaces defined by teeth formed on a lower end surface of said bush.

Also according to a further preferred feature, the above mentioned bush is rotatably mounted on said bracket and has a toothed peripheral surface cooperating with a detent which is elastically biased against said toothed surface, so as to operate as a rotation limiting device for limiting the rotation of said bush, by enabling a rotation of the bush only when the bush is subject to a torque greater that a minimum threshold determined value.

Due to the above mentioned features, the invention achieves all the above indicated objects efficiently. During a spare wheel lifting operation, aiming to loading the wheel on-board the vehicle, a rotatable member of the actuating device is rotated so as to impart a lifting movement to the flexible cable. This movement is transmitted by the flexible cable to the above mentioned supporting rod and hence to the wheel, which is connected to the above mentioned support which rests on the supporting rod. As a result of the lifting movement, the supporting rod passes through the above mentioned bush, until reaching a position of maximum lift, in which the above mentioned projections of the supporting rod come out above the upper end surface of the bush. While passing through the bush, the inclined surfaces of the ends of the projections are guided by the inclined surfaces of the ends of the ribs which define the guiding passages formed on the inner surface of the bush, so that the bush and the rod come to a relative angular position which enables said projections to pass through said guiding passages. In the position of maximum lift of the cable, the tire of the wheel engages against abutment surfaces defined by the structure of the vehicle. In this condition, by continuing the action for driving a lifting of the flexible cable, the wheel remains pressed against the abutment surfaces, while the supporting rod moves further upwardly causing a compression of the spring which is operatively interposed between said supporting rod and the support anchored to the wheel. This further lifting movement of the supporting rod causes an engagement between the above mentioned cam surfaces of the rod and the bush, with a resulting rotation of the bush relative to the rod towards a position in which the projections of the rod become vertically aligned with cooperating seats provided on the upper end surface of the bush. By continuing the lifting action, a coupling device included within the actuating device shifts to a disengaged condition in which the transmission of the movement to the flexible cable is interrupted. When this condition is reached, the user must invert the direction of rotation of the actuating member so as to cause a slight lowering of the above mentioned supporting rod, with a small relaxation of the above mentioned spring, which however remains in a loaded condition. The projections of the rod are received on cooperating seats on the upper end surface of the bush, so that the weight of the spare wheel is discharged, through said supporting rod and said bush, on said bracket secured to the vehicle structure. The weight of the wheel is thus supported by the structure of the vehicle and not by the flexible cable, which therefore is not subject to the risk to be broken. In the loaded condition, the wheel is held safely and in a precise predetermined position against the abutment surfaces of the structure of the vehicle, the operation for lifting the wheel and holding it in a locked condition being simple and quick to be carried out. The same applies naturally to the operation for releasing and lowering the wheel, which can be carried out through an inverted sequence of the above described operations.

BRIEF DESCRIPTION OF THE FIGURES

Further features and advantages of the invention will become apparent from the description which follows with reference to the annexed drawings, given purely by way of non limiting example, in which:

FIG. 7 is a perspective view from above which shows the bush in its condition mounted within the bracket secured to the vehicle structure, and FIGS. 8-16 show various steps of an operation for lifting a spare wheel in order to load the wheel on-board the vehicle, the discharging operation being carried out through an inverted sequence of steps.

DETAILED DESCRIPTION OF THE INVENTION

Figure 1:
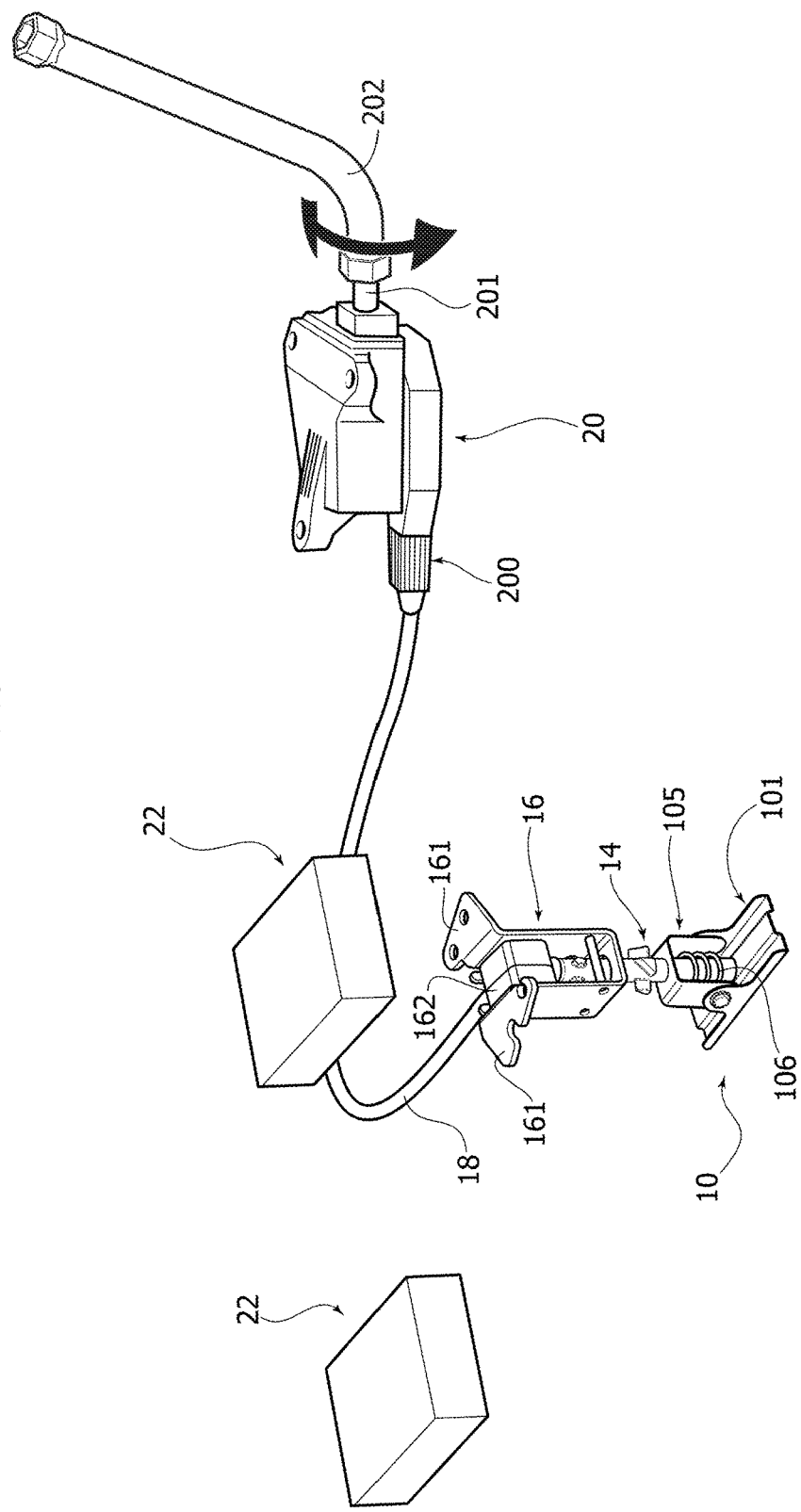
FIG. 1 is a perspective view of a preferred embodiment of a device according to the invention.

With reference to FIG. 1, numeral 10 generally designates a support to which a spare wheel R (see for example FIG. 8) is to be anchored. Support 10 may have any structure and shape adapted to this purpose. In the case of the illustrated example, it comprises a plate 101 having end portions which are to be engaged against the lower surface (with reference to FIG. 8) of the disk 12 of the wheel R. The central portion of plate 101 has two lugs 102 (see for example FIG. 9A) to which the two wings 104 of a bell-shaped member 105 are articulated by means of respective screws and nuts 103 (see FIG. 9A). In the illustrated example, the bell-shaped member 105 is formed by two L-shaped plates having two wings superimposed on each other and the other two wings defining the above mentioned wings 104. As already indicated, the structure and the shape of support 110 are described herein merely with reference to an exemplary embodiment, while it is to be understood that they may widely vary, although remaining within the scope of the present invention.

Figure 3:
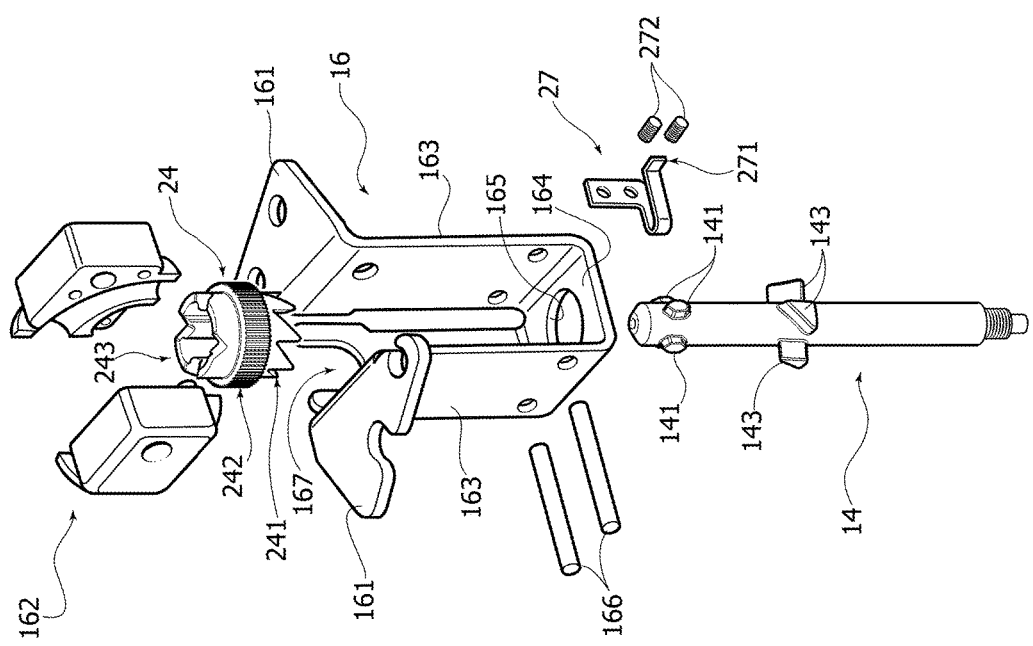
FIG. 3 is an exploded perspective view of the detail of FIG. 2.
Figure 4:
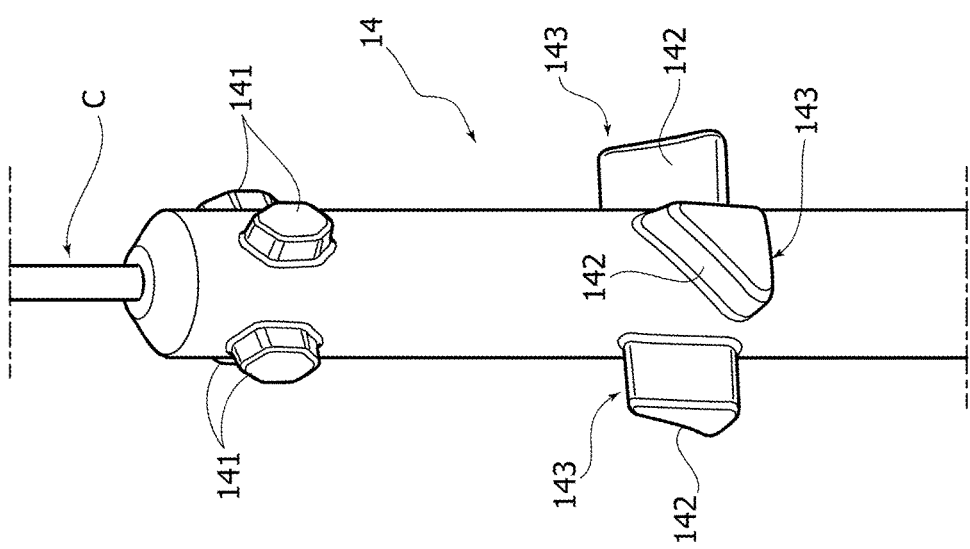
FIG. 4 is a perspective view at an enlarged scale of a detail of the supporting rod forming part of the device according to the invention.
Figure 9:
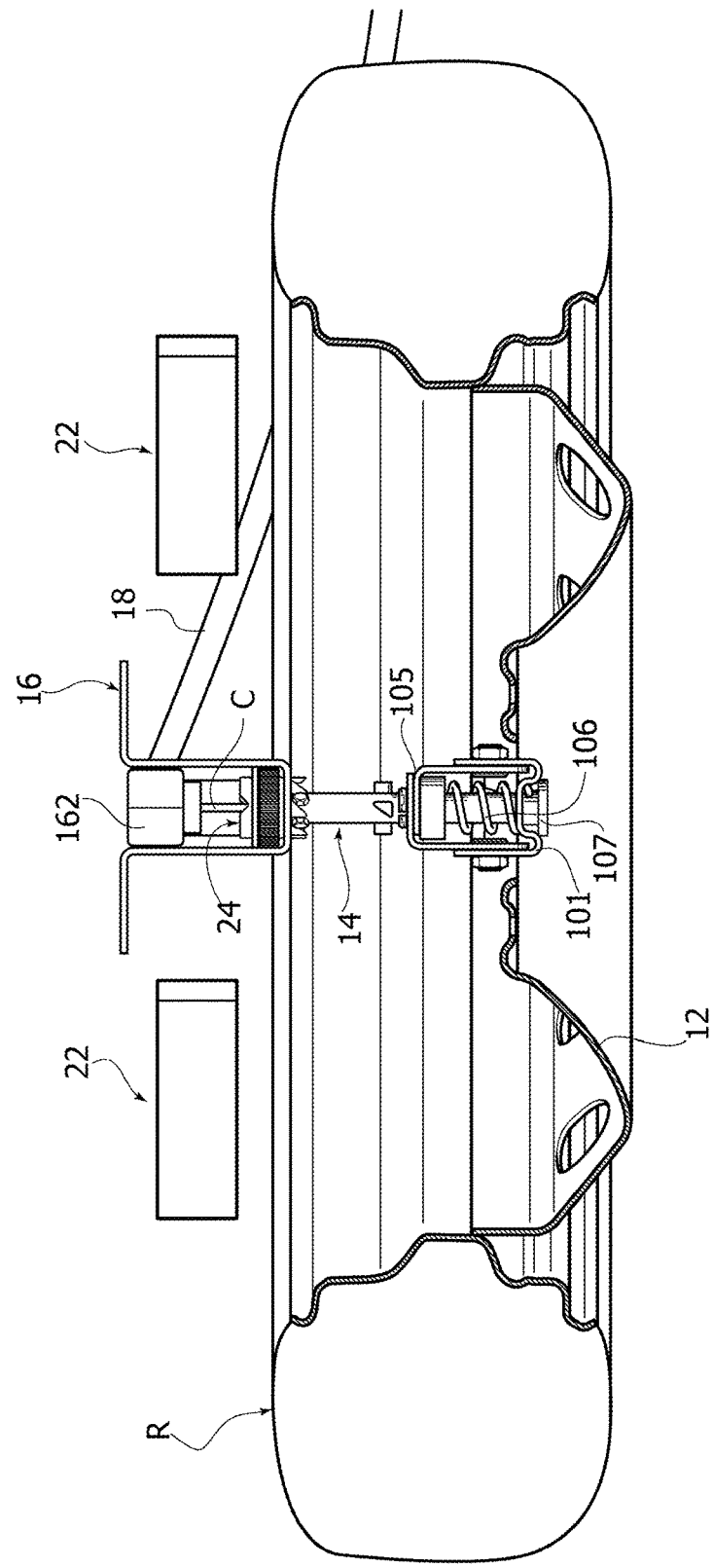

Also with reference for example to FIG. 9A, the bell-shaped member 105 is suspended, with the interposition of a spring 106, on the lower end of a supporting rod 104 (see for example FIGS. 3,4). In the illustrated example, spring 106 is constituted by a helical spring. The upper end of the supporting rod 14 is connected to one end of a flexible cable C. Also with reference for example to FIG. 9A, the superimposed wings of the two L-shaped elements defining the bell-shaped member 105 have aligned holes 105*a* through which the rod 14 is engaged. The helical spring 106 has its lower end which rests on a stop collar 107 forming part of a nut 108 (see for example FIG. 9A and also FIG. 13B) which is screwed on a threaded end portion of rod 14. The upper end of spring 106 is engaged against a spacer ring 109 interposed between spring 106 an the lower surface of the central portion of the bell-shaped member 105.

Figure 2:
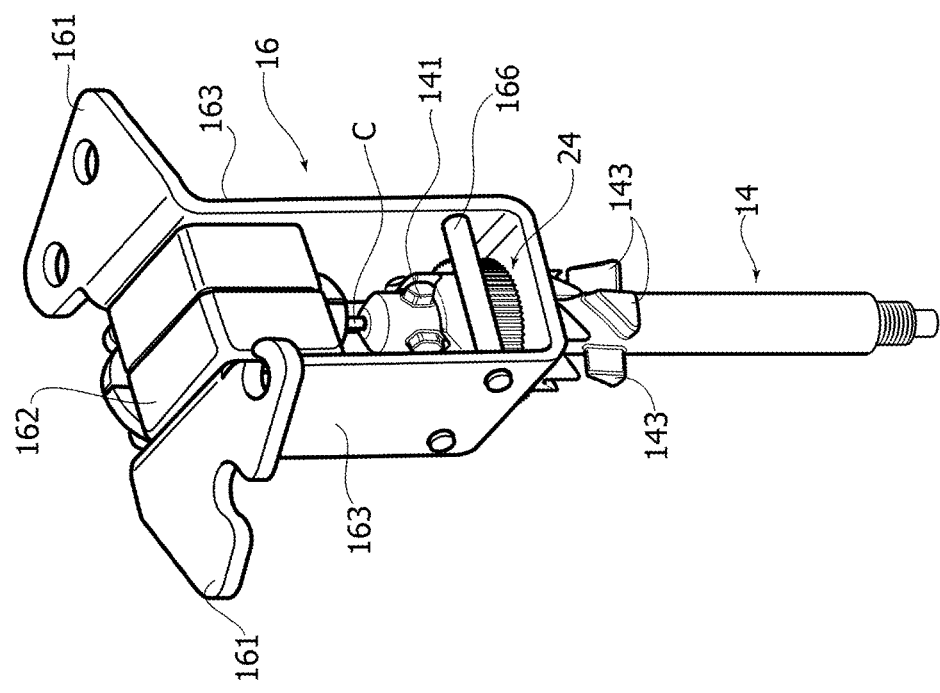
FIG. 2 is a perspective view at an enlarged scale of a detail of the device of FIG. 1.

With reference to FIGS. 1-3, the device according to the invention comprises a bracket 16 secured to the structure of the motor-vehicle and adapted to support the weight of the spare wheel when this is loaded on board the motor-vehicle. In the illustrated example, the bracket 16 has substantially an inverted omega general shape, with two upper flanges 161 provided with holes for engagement of screws for the connection to the vehicle structure. With reference in particular to FIGS. 2,3, the bracket 16 has two vertical planar parallel walls 163 which extend from the upper connecting flanges 161 down to a central wall 164 having a circular central aperture 165. Between the upper ends of walls 163, there is secured a body 162 constituted by two half-shells of plastic material (see FIG. 3) defining a guiding passage therebetween for the flexible cable C which is connected to the upper end of the supporting rod 14. The flexible cable C is further guided inside a sheath 18 (FIG. 1) having one end connected to the body 162 and the opposite end connected to the housing 200 of an actuating device 20 which can be operated in order to move the flexible cable C between the lowered wheel position and the lifted wheel position.

The actuating device can be made in any known way and has a rotatable actuating member 201 which can be operated for example by a wrench 202 (typically the same wrench which is provided on the vehicle for mounting and removing the wheels). Alternatively to this solution, it is also possible to provide for a motorized device 20. Device 20 includes any mechanism adapted to transforming the rotation of the rotatable actuating member 201 into a movement of cable C. For example, the device can have a winding pulley provided inside thereof for winding the cable, this pulley being driven by the rotatable actuating member 201 through a gear transmission. Furthermore, this device includes, in a way known per se, a coupling device adapted to become disengaged when the transmitted torque overcomes a predetermined threshold value, so as to interrupt the transmission between the actuating member 201 and the cable C. The details of construction of the actuating device 20, and in particular of the transmission provided inside its housing and the above mentioned coupling device are not described nor illustrated herein, since, as indicated, they can be made in any known way and also because this details, taken alone, do not fall within the scope of the present invention.

Figure 11:
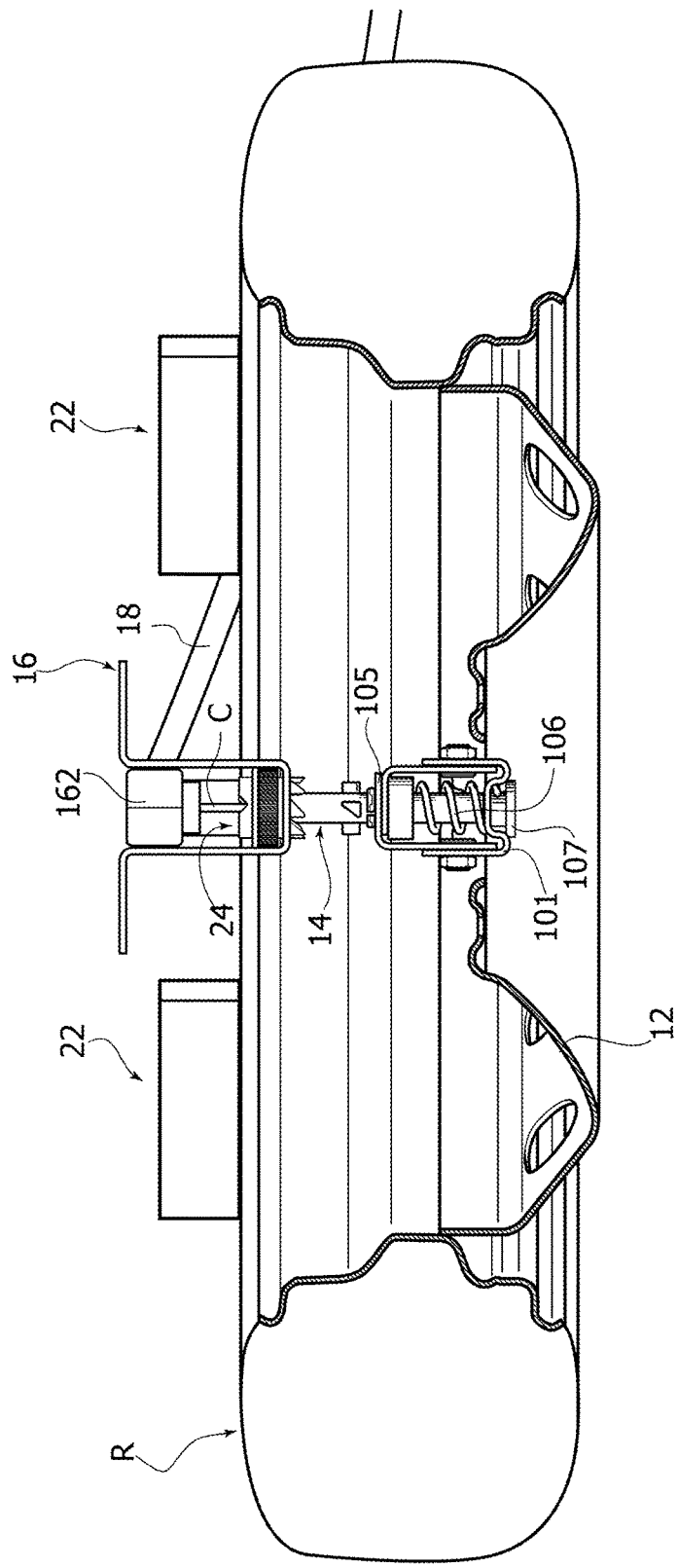

The structure of the motor-vehicle on which the device according to the invention is provided has a plurality of abutment surfaces against which the tyre of the spare wheel is pressed when the wheel is in its lifted position, loaded on board of the vehicle. With reference for example to FIGS. 1 and 11, the above mentioned abutment surfaces are defined by supports 22, diagrammatically illustrated in these figures. In principle, supports 22 must be adapted to define at least three contact points with wheel R, so as to precisely define the position of the upper plane of the wheel in the condition loaded on board the motor-vehicle.

Reverting to bracket 16 which is secured to the motor-vehicle structure, the central wall 164 of the bracket 16 has an aperture 165 within which a bush 24 is rotatably mounted, whose function will become clear in the following. With reference to FIG. 3, bush 24 has a lower end portion 241 rotatably mounted within the aperture 165, an upper portion 243 having a diameter substantially corresponding to the diameter of a lower portion 241 and an intermediate portion 242, of greater diameter, which rests above the upper surface of the central wall 164 of bracket 16.

As more clearly shown in FIG. 7, bush 24 is rotatably mounted, in an axially fixed position, on the central wall 164 of bracket 16. More precisely, bush 24 has its lower end portion rotatably engaged within the circular aperture 165 and is axially held in this position by a pair of pins 166 whose ends engage respective holes within the two lateral walls 163 of bracket 16 (see FIG. 3).

Furthermore, bush 24 is "frictioned", in that its rotation is enabled only when the bush is subject to a rotation torque greater than a minimum predetermined threshold. To this end, the intermediate portion 242 has a toothed surface cooperating with a detent 271 of a leaf spring 27 (see also FIG. 3) having a base portion secured by two screws 272 to a third wall 167 of bracket 16. Detent 271 is therefore elastically pressed into a hollow between two subsequent teeth of the toothed portion 242 of bush 24, so as to act as a rotation imitator, by preventing an undesired rotation of bush 24 when the latter is not subject to a torque greater than a predetermined threshold.

Also with reference to FIGS. 3 and 4, the rod 14 anchored to the flexible cable C has a lateral surface which in proximity of its upper end (with reference to the drawings) has a plurality of projections 141, substantially in form of short ribs having opposite ends with a tapered, pointed, shape defined by inclined surfaces converging towards each other, whose function will became apparent in the following.

Figure 6:
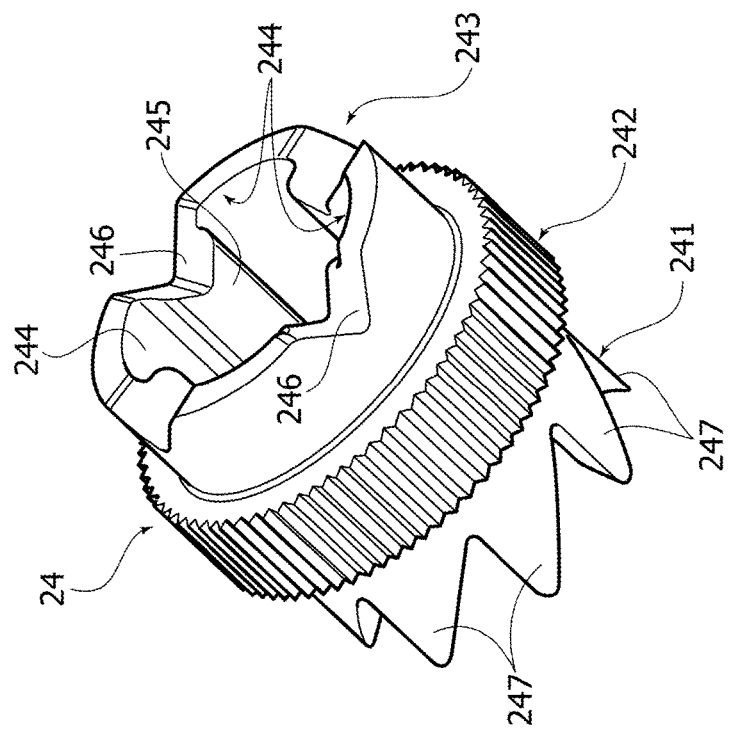
FIGS. 5, 6 are perspective views of the bush forming part of the device according to the invention.
Figure 5:
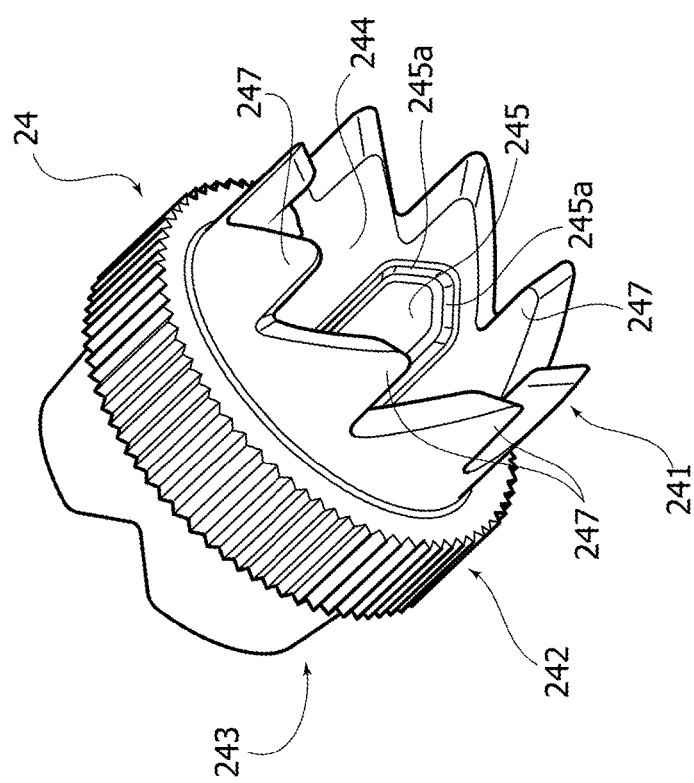

As visible for example in FIG. 2, in the terminal portion of the lifting operation of the wheel starting from its lowered position resting on the ground, the supporting rod 14 passes through the bush 24, due to that the above mentioned projections 141 of the supporting rod 14 pass through guiding passages 244 formed in the inner surface of bush 24 (see FIGS. 5,6). The inner guiding passages 244 of bush 24 are defined between ribs 245 formed on the inner surface of bush 24 and having opposite tapered ends, with a pointed shape, defined by inclined surfaces converging towards each other (designated by 245a in FIG. 5).

As will become even more apparent in the following, the inclined surfaces 245a of the ends of the inner ribs 245 of the bush are adapted to cooperate with inclined surfaces at the ends of projections 141 of the supporting rod 14 when the latter is pulled vertically through the bush 24. The mutual engagement of these inclined surfaces causes, by a cam-action, a relative rotation of bush 24 with respect to rod 14, which guides the projections 141 of the rod 14 until they enter into the guiding passages 244. Thanks to this measure, when the supporting rod 14 moves upwardly and must pass through the bush 24, the bush is caused to rotate to the position in which projections 141 engage the guiding passages 244, thus enabling the vertical movement of the supporting rod 14 through the bush 24.

As also will be illustrated more in detail in the following, during the operation for lifting the wheel, the supporting rod 14 is moved vertically upwardly through the bush 24 until when the projections 141 of the rod 14 come out upwardly from the bush 24. Thus, a condition is reached in which the wheel R is in contact with the abutment surfaces defined by supports 22 of the structure of the vehicle. By further continuing the lifting operation, the wheel R does not have any appreciable lifting movement (a part from a slight upward movement allowed by the tyre deformation) since it is in contact with supports 22. However, rod 14 keeps on moving upwardly, due to the deformation of the spring which is operatively interposed between the rod 14 and the bell-shaped member 105 carrying the wheel R. In this final step of the lifting operation of the rod 14, a mutual engagement of the cam surfaces of the rod 14 and the bush 24 takes place. The cam surfaces of the rod 14 are constituted by inclined surfaces 142 of a plurality of teeth 143 formed on the lateral surface of the rod 14, at a position spaced downwardly with respect to the projections 141 which have been described above (see FIG. 4).

The cam surfaces of the bush 24 are constituted by inclined surfaces defining the side surfaces of teeth 247 formed in the lower end surface of the bush 24 (see FIGS. 5,6). The mutual engagement of the above mentioned cam surfaces in the final portion of the lifting movement of the rod 14 causes bush 24 to rotate in a determined direction (a clockwise direction in this case due to the inclination selected for the teeth) with respect to rod 14 after that projections 141 have come out above bush 24, so that said projections 141 come to be vertically aligned above seats 246 formed on the upper end surface of bush 24 (FIGS. 5, 6). As it will be shown more in detail in the following, once this condition is reached, and once the driving transmission becomes disengaged due to that the allowed maximum transmission torque has been overcome, the action on the actuating wrench 202 can be inverted so as to impart a lowering movement to the flexible cable C which brings the upper projections 141 of the supporting rod 14 to rest on the supporting seats 246 of bush 24. In this condition, the weight of the wheel is entirely discharged, through the supporting rod 14 and bush 24, on bracket 16 and hence on the motor-vehicle structure.

The entire operation of the device is again described in the following with reference initially to a lifting operation of the spare wheel, aiming to bring the wheel from a condition resting on the ground to a condition loaded on board the vehicle, and later on with reference to an inverted step for releasing and lowering the wheel on the ground.

In the first part of the lifting operation, the actuating wrench 202 is rotated in the direction (for example the clockwise direction in FIG. 1) which causes a lifting movement of the flexible cable C. The cable C is guided within sheath 18 and through the body 162 so as to cause lifting of the supporting rod 14 and hence of the spare wheel, which is suspended to the supporting rod 14 through plate 101 to which the disk of wheel R is anchored. Plate 101 on its turn is connected to the bell-shaped element 105 which is supported through the helical spring 106 by the lower end of the supporting rod 14. In this stage, the load applied to spring 106 substantially corresponds to the weight of wheel R and is not sufficient for causing a compression of this spring.

FIG. 8 shows wheel R during the first part of the lifting operation of the wheel, in which the supporting rod 14 is not yet come to engage through bush 24 and in which the upper surface of the tyre is still spaced apart from the abutment surfaces defined by supports 22. By continuing lifting of cable C, the supporting rod 14 is engaged with its upper end within bush 24. FIG. 9B shows the cam action which takes place due to the mutual engagement between the inclined surfaces 245a defined by the lower ends of the inner ribs 245 of bush 24 and the upper ends of the projections 141 of the supporting rod 14. Due to disengagement, the upward force applied to projection 141 causes a rotation of bush 24 (in a clockwise direction if seen from above) so that the projections 141 are able to be engaged properly within the guiding passages 244 formed on the inner surface of bush 24, as visible in FIG. 10. During this stage, the helical spring 106 is substantially subjected to a load corresponding to the weight of wheel R, and therefore remains in the configuration shown in FIG. 9A.

FIGS. 11 and 11A further show the lifting stage of cable C, during which the projections 141 of the supporting rod 14 are passing through the inner guiding passages 244 of bush 24, spring 106 remaining substantially undeformed.

Figure 12:
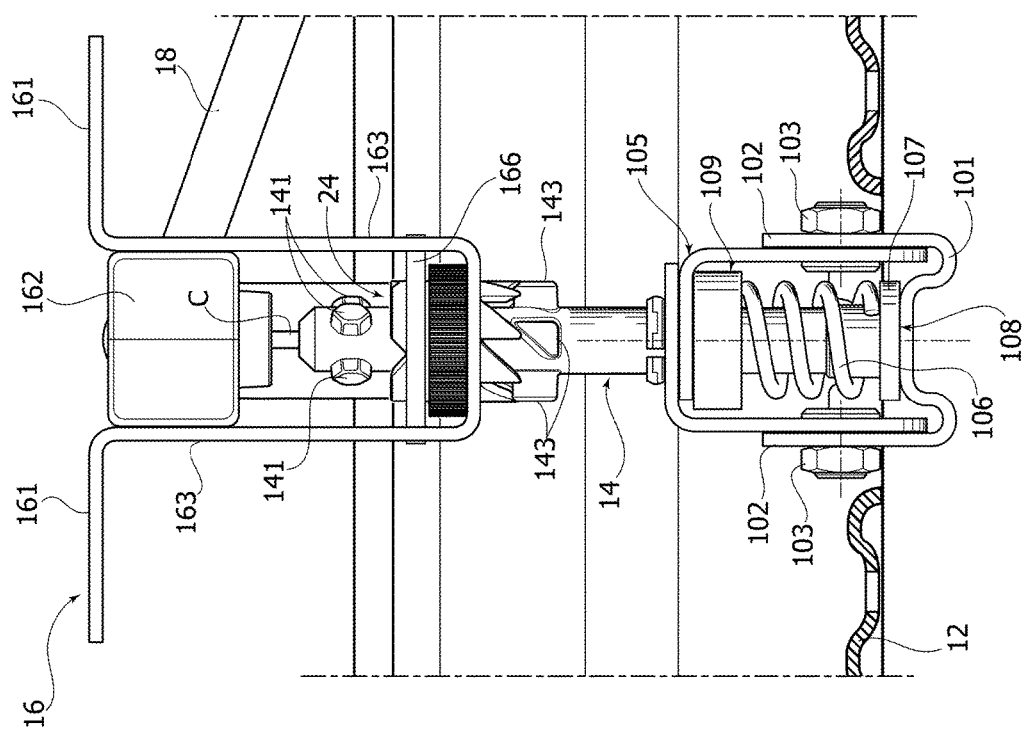

FIG. 12 shows a stage in which following continued lifting of the flexible cable C, the supporting stem 14 is further displaced upwardly with respect to bush 24 and bracket 16, so that the upper projections 141 of rod 14 come out above bush 24. In this stage, bush 24 is not engaged by the supporting rod, so that position thereof is ensured by the rotation limiting device constituted by the elastic detent 271. In this condition, the upper surface of wheel R comes in contact with the abutment surfaces defined by supports 22, so that wheel R and hence the bell-shaped element 105 which is anchored thereto are not able to further move upwardly. Starting from this condition, any further upward movement of the supporting rod 14 imparted through the flexible cable C by the actuating device causes an upward relative movement of stem 14 relative to the bell-shaped element 105, with a resulting compression of the helical spring 106, as visible in FIGS. 12 and 12B.

Figure 13:
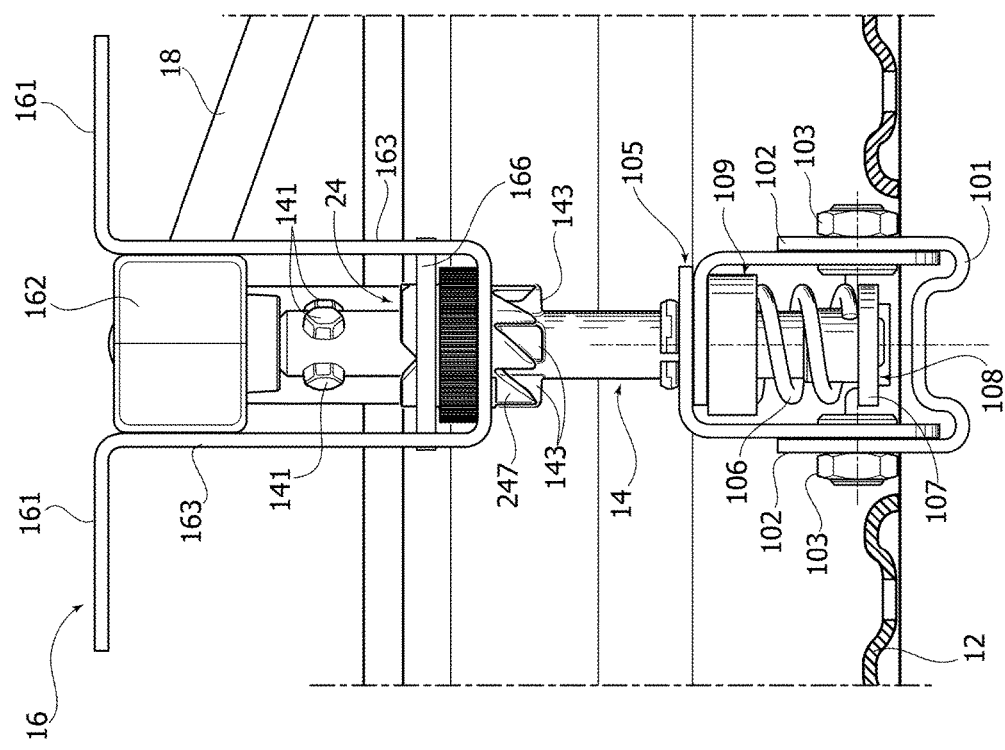
Figure 13A:
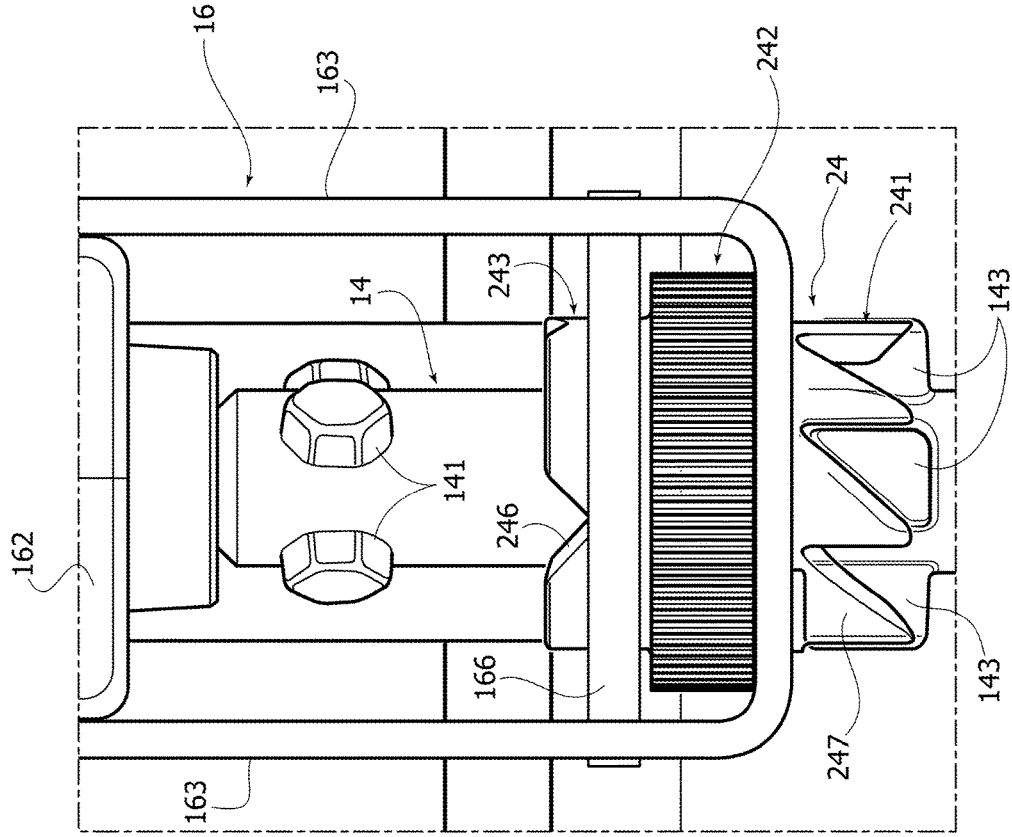
Figure 13B:
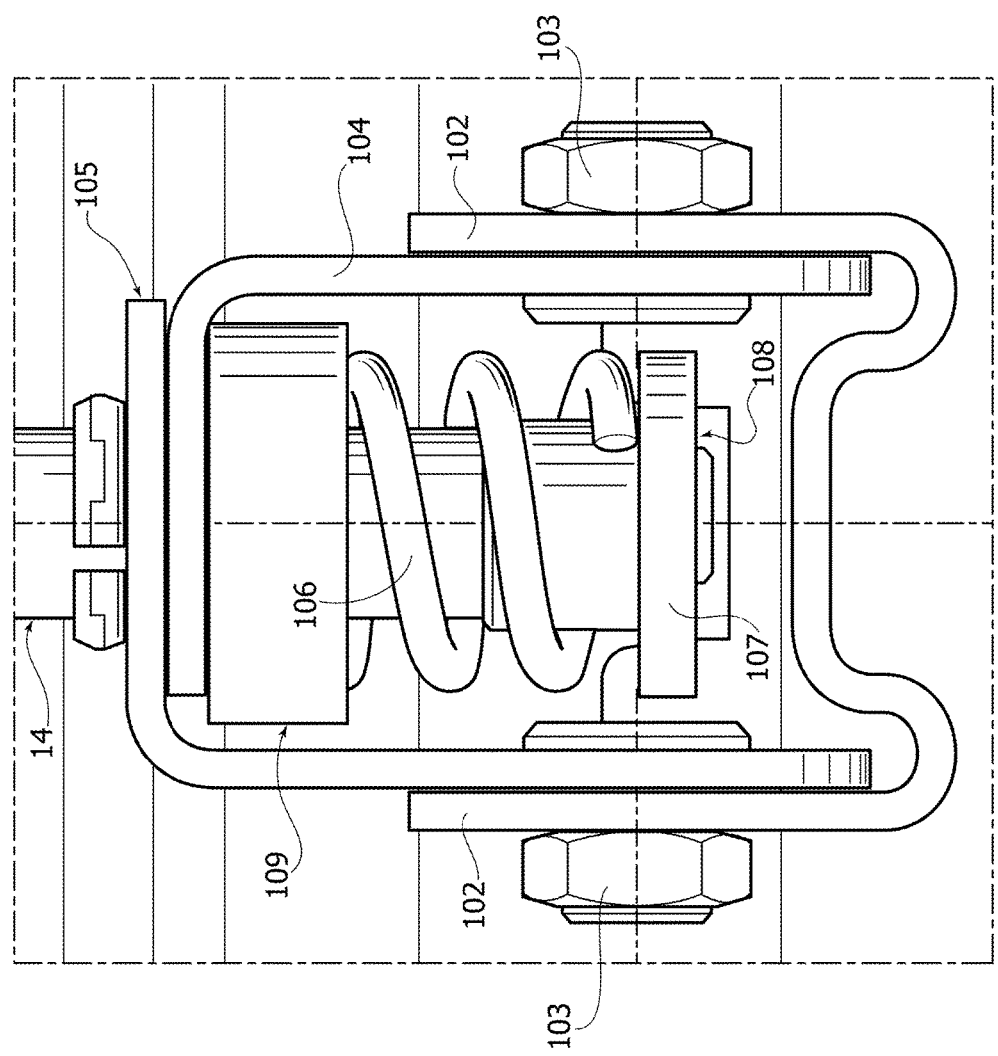

In this stage, as better visible in FIG. 12A, the cam surfaces defined by the teeth 247 on the lower end of bush 24 and the projections 142 of the supporting rod 141 come into engagement with each other, in order to cause a relative clockwise rotation (due to the teeth inclination), as already described, of bush 24 relative to the supporting rod, such as to partially align seats 246 provided on the upper surface of bush 24 with the projections 141 of the supporting rod 14. FIG. 12A shows the beginning of this stage, when the cam surfaces of bush 24 and the supporting rod 14 are still engaged only partially, so that the projection 141 of the supporting rod are not aligned with seats 246. FIGS. 13 and 13A show instead the final stage in which the full mutual engagement of said cam surfaces has caused the above mentioned relative rotation between bush 24 and the supporting rod 14, so that seats 246 of bush 24 come to a position below projections 141 (see also FIG. 14 and FIG. 15) not in a perfectly vertically aligned condition, but ready for engagement (FIG. 14).

As already indicated in the foregoing, preferably the actuating device 20 is provided with a coupling device which shifts into a disengaged condition when the reacting torque overcomes a predetermined threshold value. By continuing the lifting action of the flexible cable C, the supporting rod 14 keeps on moving upwardly, causing a further compression of spring 106, until when the force imparted to the transmission overcomes the above mentioned predetermined threshold value, with a resulting shift of the coupling device into the disengage condition. This shift can be sensed by the user both because the torque opposing the action applied by the user through the actuating wrench disappears, and also acoustically. Once this condition is reached, the operator must simply invert the direction of rotation of the actuating wrench so as to cause a lowering back of the supporting rod 14 and a slight relaxation of the helical spring 106, which however remains in a loaded condition, which ensures that wheel R is anyway always pressed against the abutment surfaces defined by supports 22 under the floor panel of the motor-vehicle. Due to this lowering movement, the projections 141 of the supporting rod 14 are received on the V-shaped seats 246 of the upper end surface of bush 24, with a further clockwise rotation of bush 24 (see FIGS. 14 and 15) which causes an out-of-alignment movement of teeth 246 with respect to teeth 142 (which is required for any future operation for releasing the wheel). Therefore, in this condition, the entire weight of the wheel comes to be discharged, through the supporting rod 14 and bush 24, on the bracket 16 and the motor-vehicle structure.

Also in the lowering stage of the supporting rod, through a certain fraction of time, bush 24 is not engaged with rod 14, so that its position is held by the rotation limiting device 271.

Figure 16:
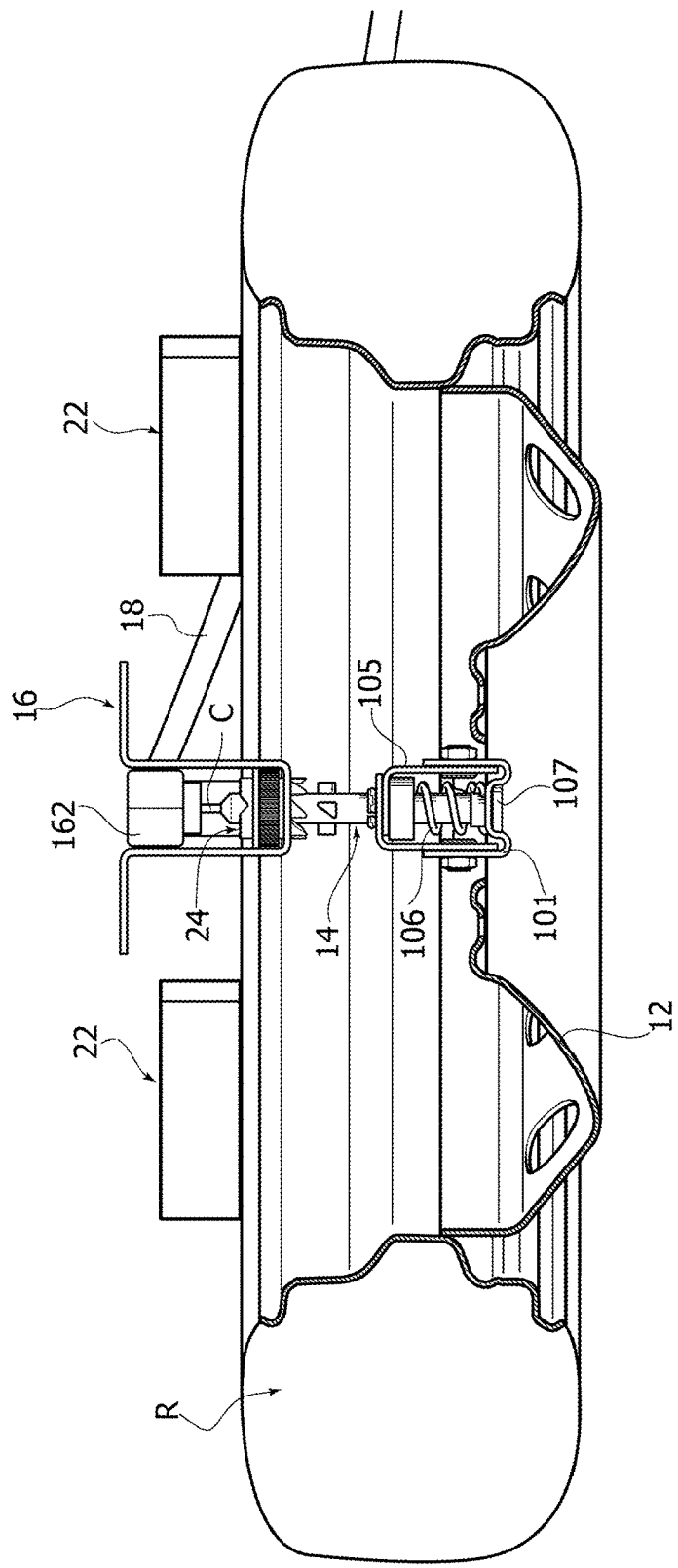

As indicated in the foregoing, spring 106 remains in its loaded condition, so that it keeps the system tensioned, with wheel R pressed against supports 22 (FIG. 16).

An operation for unloading the wheel is carried out by an inverted sequence of the steps which have been described above. Starting from the condition of wheel lifted and loaded on board the vehicle, the user starts a wheel releasing operation by operating the actuating device 20 so as to slightly lift the flexible cable C in order to disengage projections 141 of the supporting stem 14 from the associated seats 246 formed on the upper surface of bush 24. In this stage, through a fraction of time bush 24 is not engaged by rod 14 so that its position is ensured by the rotation limiting device 271. In this stage, since the wheel is in contact against supports 22, the above action by the user causes a further compression of the helical spring 106 associated to the bell-shaped element. By continuing the action on the actuating device which causes a lifting of a flexible cable C, the mutual engagement of the cam surfaces defined by teeth 247 of bush 24 and projections 143 of rod 14 causes a rotation of bush 24 (in a clockwise direction if viewed from above) so that projections 141 come back in the out-of-alignment condition with respect to seats 246, as shown in FIGS. 12 and 12A. In this way, projections 141 of rod 14 come to be aligned with the guiding inner passages 244 of bush 24. During this stage, the helical spring 106 has been further compressed, due to the lifting of the supporting rod 14.

When the above mentioned operation is completed, the cam surfaces defined by teeth 247 of bush 24 and projections 143 of the supporting rod have reached a condition of a full mutual engagement, thereby generating a resisting force which causes the coupling device associated with the actuating device 20 to become disengaged. Again, the user is able to sense this condition, also acoustically, so that he is advised that it is now necessary to invert the direction of rotation of the actuating wrench, in order to lower the flexible cable C and the wheel carried thereby. During this lowering operation, projections 141 of rod 14 pass through the guiding passages 244 of bush 24, so that the supporting rod 14 can displace further downwardly, until when projections 141 come out from below bush 24, as shown in FIG.

8. Also during this passage through bush 24, through a fraction of time the latter is not engaged by the supporting rod, so that its position is ensured by the rotation limiting device 271. Spring 106 is able to come back in its undeformed condition, due to that the tyre of wheel R moves away from the abutment surfaces defined by supports 22. The lowering operation can be continued until wheel R is deposited on the ground, after which plate 106 to which the bell-shaped element 105 is connected can be separated from the wheel.

As it clearly appears from the foregoing description, the device according to the invention provides a number of important advantages. First of all, in the lifted condition in which the spare wheel is loaded on board the vehicle, the wheel is held in a predetermined fixed position. Secondly, the device is extremely simple and easy to be used. Furthermore, the device is composed by a relatively reduced number of components, with the advantage that it is simple and inexpensive to be manufactured. Finally, the device can be adapted also on motor-vehicles originally having no means of this kind, with relatively simple and quick operations.

Naturally, while the principle of the invention remains the same, the details of construction and the embodiments may widely vary with respect to what has been described and illustrated purely by way of example, without departing from the scope of the present invention.

What is claimed is:

1. Device for loading and unloading a spare wheel of a vehicle, comprising:
    a flexible cable, movable between a lifted wheel position and a lowered wheel position,
    an actuating device, operable to move the flexible cable between said lifted and lowered wheel positions,
    a support anchored to the wheel, which is elastically suspended to a support member earned by the flexible cable, and
    a bracket secured to the vehicle structure, on which the weight of the wheel is discharged through said support member, when the flexible cable arrives to its lifted wheel position,
    said support member comprising a rod having an upper portion connected to the flexible cable and a lower portion on which said support that is anchored to the wheel is supported by the interposition of a spring,
    said bracket secured to the vehicle structure comprises an axially fixed bush, which is traversed by said supporting rod following an actuation of the flexible cable,
    said supporting rod having a side surface provided with projections adapted to pass through guiding passages of the inner surface of said bush during movement of the flexible cable, said projections coming out upwardly from said bush in a final part of the lifting movement of the flexible cable, and
    said supporting rod and said bush having respective cam surfaces which come into engagement with each other in the final part of the lifting movement of the flexible cable, so as to cause rotation of said bush relative to the supporting rod to a position in which, following a subsequent lowering of the flexible cable, said projections are received on seats arranged on an upper end surface of the bush, so as to discharge the weight of the wheel, through said stem and said bush, on said bracket secured to the vehicle structure.

2. Device according to claim 1, wherein said guiding passages on the inner surface of said bush are defined between ribs having ends defining inclined surfaces which cooperate with inclined surfaces of the ends of said projections of the supporting rod so as to angularly orient said bush relative to said rod during movement of the flexible cable, to guide said projections into said guiding passages.

3. Device according to claim 1, wherein said cam surfaces of said rod and said bush comprise a plurality of inclined surfaces defined by teeth protruding from the rod at a position spaced downwards with respect to the position of said projections, and a plurality of corresponding cam surfaces defined by teeth formed on a lower end surface of said bush.

4. Device according to claim 1, wherein said bush is rotatably mounted on said bracket and has a toothed peripheral surface cooperating with a detent which is elastically biased against said toothed surface, so as to operate as a rotation limiting device for limiting the rotation of said bush, by enabling a rotation of the bush only when the bush is subject to a torque greater than a minimum threshold determined.

5. Device according to claim 1, wherein said actuating device includes a rotatable actuating member and a transmission that converts the rotation of said rotatable actuating member into a movement of the flexible cable, said transmission being adapted to become disengaged when a transmitted torque exceeds a determined threshold value.

* * * * *